United States Patent [19]

Sakashita et al.

[11] Patent Number: 5,286,834
[45] Date of Patent: Feb. 15, 1994

[54] MELT PREPARATION OF COPOLYCARBONATE WITH ALKALINE COMPOUND CATALYST AND BORIC ACID COMPOUND CATALYST

[75] Inventors: Takeshi Sakashita, Iwakuni; Tomoaki Shimoda, Kuga; Kotaro Kishimura, Kwakuni, all of Japan

[73] Assignee: GE Plastics Japan, Ltd., Tokyo, Japan

[21] Appl. No.: 944,377

[22] Filed: Sep. 14, 1992

[30] Foreign Application Priority Data

Oct. 29, 1991 [JP] Japan .................. 3-283347

[51] Int. Cl.$^5$ ............................. C08G 64/30
[52] U.S. Cl. .................... 528/198; 524/183; 524/405; 524/611; 528/199; 528/204
[58] Field of Search ............. 528/198, 199, 204; 524/183, 405, 611

[56] References Cited

U.S. PATENT DOCUMENTS 5,151,491  9/1992  Sakashita et al. .............. 528/198

Primary Examiner—Harold D. Anderson

[57] ABSTRACT

A copolymeric polycarbonate containing repeating constituent units having formula [I] below and repeating constituent units having formula [II] below in a molar ratio of from 98:2 to 40:60.

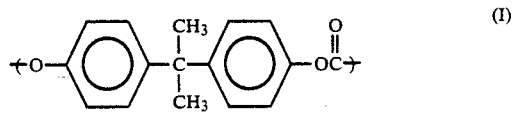

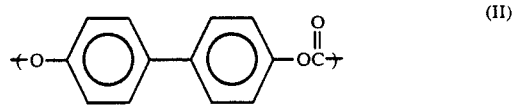

The above-described copolymeric polycarbonates have excellent resistance to chemicals, heat resistance and flame retardancy without compromising the impact resistance and good hues intrinsic to polycarbonates.

7 Claims, No Drawings

MELT PREPARATION OF COPOLYCARBONATE WITH ALKALINE COMPOUND CATALYST AND BORIC ACID COMPOUND CATALYST

DETAILED DESCRIPTION OF THE INVENTION

1. Field of the Invention

The present invention relates to copolymeric polycarbonates and to a method for preparing these. More specifically, it relates both to copolymeric polycarbonates that have enhanced resistance to chemicals, heat resistance and flame retardancy without compromising the impact resistance and good hues intrinsic to polycarbonates, and also to a method that is capable of preparing copolymeric polycarbonates such as these. In addition, this invention relates also to copolymeric polycarbonate compositions containing copolymeric polycarbonates such as these.

2. Technical Background of the Invention

Because polycarbonates have excellent mechanical properties such as impact resistance, as well as excellent heat resistance, transparency and other properties, they are widely used in applications such as mechanical components, optical disks, and automotive parts.

However, further improvements have been sought in the resistance to solvents and other chemicals, the heat resistance and the flame retardancy of such polycarbonates.

In response to such demands, Japanese Published Unexamined Patent Application [Kokai] No. 52-109,591 (1977) proposes a method for producing copolymeric polycarbonates that uses hydroquinone and/or an ester-forming derivative thereof as part of the aromatic dihydroxy compound, and thereby obtains copolymeric polycarbonates having excellent solvent resistance. However, when polycarbonates are prepared by means of a melt polycondensation process using the diester carbonates mentioned in the above Kokai, the hydroquinone is oxidized during polycondensation and tends to brown or yellow, as a result of which the copolymeric polycarbonates obtained after polycondensation have ended up discoloring. In addition, the molecular weight of the polycarbonate obtained during molding sometimes decreases, as a result of which it is desirable to enhance the residence stability of the polycarbonate.

Japanese Published Examined Patent Application [Kokoku] No. 63-25,016 (1988), for example, proposes polyester-polycarbonate copolymers that use aromatic dicarboxylic acids such as terephthalic acid and isophthalic acid in order to increase the heat resistance and chemical resistance of the polycarbonate. However, a drawback with the copolymers cited in this Kokoku is their low impact resistance.

Various flame retardants, including halogen-based, sulfur-based, and phosphorus-based flame retardants, have been proposed for imparting flame retardant properties to polycarbonates. However, these flame retardants must be compounded in a rather large amount of polycarbonate; polycarbonate to which such flame retardants have been added ends up incurring a decline in water resistance, residence stability, mechanical properties and the like.

Hence, the emergence of polycarbonates having excellent chemical resistance, heat resistance and flame retardancy, as well as outstanding transparency, water resistance and hue, without a loss in the properties intrinsic to polycarbonates has been awaited.

The present inventors conducted intensive research aimed at obtaining polycarbonates having improved chemical resistance, heat resistance and flame retardancy without compromising the excellent mechanical properties and transparency intrinsic to polycarbonates. As a result of their studies, they found that copolymeric polycarbonates containing constituent units derived from biphenols have the above-mentioned properties. This discovery ultimately led to the present invention. In addition, the present inventors also found that by using specific catalysts when copolymerizing biphenol-containing aromatic dihydroxy compounds and diester carbonates by means of a melt polycondensation process, polycarbonates having excellent properties can be obtained. This too led ultimately to the present invention.

OBJECT OF THE INVENTION

The present invention was conceived in light of the above-described prior art. Its object is to provide copolymeric polycarbonates having improved chemical resistance, heat resistance and flame retardant properties without compromising the heat resistance and good hues intrinsic to polycarbonates. Another object of this invention is to provide a method capable of preparing copolymeric polycarbonates such as this.

GIST OF THE INVENTION

The copolymeric polycarbonate according to this invention contains repeating constituent units having formula [I] below and repeating constituent units having formula [II] below in a molar ratio of from 98:2 to 40:60.

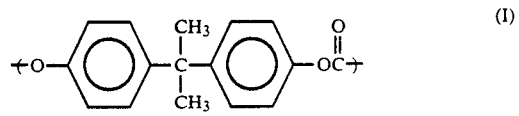

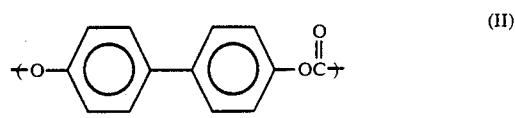

The method for preparing copolymeric polycarbonates according to the present invention is characterized by the melt copolycondensation, in the presence of an alkaline compound catalyst, of an aromatic dihydroxy compound containing an aromatic dihydroxy compound having formula [III] below and an aromatic dihydroxy compound having formula [IV] below in a molar ratio of from 98:2 to 40:60 with a diester carbonate.

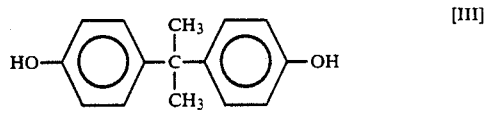

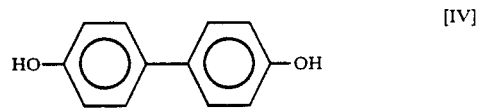

A copolymeric polycarbonate composition consisting of:

[A] the above-described copolymeric polycarbonate, which is a reaction product, and

[B] 0.05-10 ppm, based on copolymeric polycarbonate [A], of a sulfonic acid compound [B] having formula [V] below.

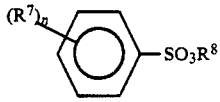

[where $R^7$ is a hydrocarbon group (in which the hydrogens may be substituted with halogens) having 1-6 carbons; $R^8$ is a hydrocarbon group (in which the hydrogens may be substituted with 1-8 carbons) having 1-8 carbons; and n is an integer from 0 to 3].

In addition, the copolymeric polycarbonate composition according to the present invention consists of, together with [A] the above-mentioned copolymeric polycarbonate and [B] the above-mentioned sulfonic acid compound:

[C] 1-2000 ppm, based on the copolymeric polycarbonate, of an epoxy compound, and

[D] 10-1000 ppm, based on the copolymeric polycarbonate, of a phosphorus compound.

Also, in the method for preparing copolymeric polycarbonates according to the present invention, it is desirable to use, per mole of the aromatic dihydroxy compound:

(a) $5 \times 10^{-5}$ to $7.5 \times 10^{-4}$ mole of a nitrogen-containing basic compound, and/or (b) $5 \times 10^{-8}$ to $8 \times 10^{-7}$ mole of an alkali metal compound and/or an alkaline earth metal compound as the alkaline compound catalyst.

The copolymeric polycarbonate according to the present invention contains constituent units derived from specific aromatic dihydroxy compounds in the above-mentioned specific amounts. These copolymeric polycarbonates have an excellent chemical resistance, heat resistance and flame retardancy without compromising the intrinsic impact resistance and good hues of polycarbonates.

The copolymeric polycarbonate compositions according to the present invention include a copolymeric polycarbonate [A], a specific sulfonic acid compound [B], an epoxy compound [C] and a phosphorus compound [D], and also have an excellent heat resistance, hue, chemical resistance and flame retardancy.

CONCRETE DESCRIPTION OF THE INVENTION

The copolymeric polycarbonates according to the present invention shall now be described more concretely.

The copolymeric polycarbonates according to this invention contain repeating constituent units having formula [I] below and repeating constituent units having formula [II] below.

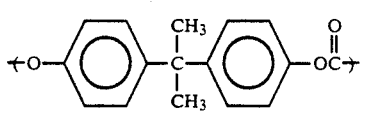

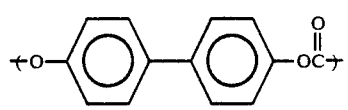

The copolymeric polycarbonates according to this invention contain the repeating constituent units having formula [I] and the repeating constituent units having formula [II] in a molar ratio of 98:2 to 40:60, and preferably 95:5 to 60:40.

The copolymeric polycarbonates according to the present invention contain repeating constituent units having formulas [I] and [II] above, and have excellent chemical resistance, heat resistance and flame retardancy without compromising the impact resistance and good hues intrinsic to polycarbonates. In this way, the copolymeric polycarbonates according the present invention that have excellent chemical resistance, heat resistance and flame retardancy do not readily give rise to stress cracking on account of gasoline or other solvents, and undergo only a small decrease in physical properties at high temperatures. Copolymeric polycarbonates such as this maintain an outstanding mechanical strength for a long period of time and are able to form molded bodies having an excellent transparency.

The copolymeric polycarbonate production method according to the present invention shall now be described more concretely.

In the present invention, first the aromatic dihydroxy compounds and the diester carbonate are melt copolycondensed in the presence of an alkaline compound catalyst, thereby producing a copolymeric polycarbonate.

In the present invention, the compound having formula [III] below (bisphenol A) or a derivative thereof and the compound having formula [IV] below (4,4'-dihydroxydiphenyl, commonly known as "biphenol") or a derivative thereof are used as the aromatic dihydroxy compounds.

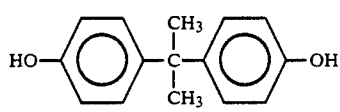

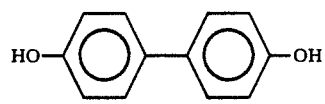

In the present invention, these aromatic dihydroxy compounds represented by formulas [III] and [IV] are used in a molar ratio of 98:2 to 40:60, and preferably 95:5 to 60:40.

Specific examples that may be cited of the diester carbonate used in the present invention include diphenyl carbonate, ditolyl carbonate, bis(chlorophenyl) carbonate, m-cresyl carbonate, dinaphthyl carbonate, bis(diphenyl) carbonate, diethyl carbonate, dimethyl carbonate, dibutyl carbonate and dicyclohexyl carbonate.

Of these, the use of diphenyl carbonate is especially desirable.

These diester carbonates can be used alone or as combinations thereof.

Diester carbonates such as those mentioned above may contain preferably up to 50 mol %, and even more preferably up to 30 mol %, of dicarboxylic acids or dicarboxylates.

Examples that may be cited of these dicarboxylic acids or dicarboxylates include aromatic dicarboxylic acids [and esters] such as terephthalic acid, isophthalic acid, diphenyl terephthalate and diphenyl isophthalate; aliphatic dicarboxylic acids [and esters] such as succinic acid, glutaric acid, adipic acid, pimelic acid, suberic acid, azelaic acid, sebacic acid, decanedioic acid, dodecanedioic acid, diphenyl sebacate, diphenyl decanedioate and diphenyl dodecanedioate; and alicyclic dicarboxylic acids [and esters] such as cyclopropanedicarboxylic acid, 1,2-cyclobutanedicarboxylic acid, 1,3-cyclobutanedicarboxylic acid, 1,2-cyclopentanedicarboxylic acid, 1,3-cyclopentanedicarboxylic acid, 1,2-cyclohexanedicarboxylic acid, 1,3-cyclohexanedicarboxylic acid, 1,4-cyclohexanedicarboxylic acid, diphenyl cyclopropanedicarboxylate, diphenyl 1,2-cyclobutanedicarboxylate, diphenyl 1,3-cyclobutanedicarboxylate, diphenyl 1,2-cyclopentanedicarboxylate, diphenyl 1,3-cyclopentanedicarboxylate, diphenyl 1,2-cyclohexanedicarboxylate, diphenyl 1,3-cyclohexanedicarboxylate and diphenyl 1,4-cyclohexanedicarboxylate.

Dicarboxylic acids or dicarboxylates such as these may be included alone or as combinations thereof.

It is desirable that the above-cited diester carbonates generally be used in an amount of 1.0–1.30 moles, and preferably 1.01–1.20 moles, per mole of the total aromatic dihydroxy compounds.

In the present invention, the above-mentioned aromatic dihydroxy compound and diester carbonate are melt copolycondensed in the presence of an alkaline compound catalyst.

Examples of such alkaline compound catalysts that can be used include:
(a) nitrogen-containing basic compounds and/or
(b) alkali metal compounds and/or alkaline earth compounds.

Nitrogen-containing basic compounds (a) such as this include nitrogen-containing basic compounds that are readily decomposable or volatile at high temperatures. Specific examples that may be cited include ammonium hydroxides having alkyl, aryl, or alaryl groups, such as tetramethylammonium hydroxide ($Me_4NOH$), tetraethylammonium hydroxide ($Et_4NOH$), tetrabutylammonium hydroxide ($Bu_4NOH$) and trimethylbenzylammonium hydroxide ($C_6H_5$—$CH_2(Me)_3NOH$); tertiary amines such as trimethylamine, triethylamine, dimethylbenzylamine and triphenylamine; secondary amines having the formula $R_2NH$ (where R may be, for example, an alkyl such as methyl or ethyl, or an aryl group such as phenyl or toluyl); primary amines having the formula $RNH_2$ (where R is the same as above); imidazoles such as 2-methylimidazole and 2-phenylimidazole; and basic salts such as ammonia, tetramethylammonium borohydride ($Me_4NBH_4$), tetrabutylammonium borohydride ($Bu_4NBH_4$), tetrabutylammonium tetraphenyl borate ($Bu_4NBPh_4$) and tetramethylammonium tetraphenylborate ($Me_4NBPh_4$).

These compounds may be used alone or as combinations of two or more thereof.

Of these, preferable use can be made of tetraalkylammonium hydroxides, with the use of tetramethylammonium hydroxide or tetra-n-butylammonium hydroxide being especially preferable.

It is preferable that the nitrogen-containing basic compound (a) used in the present invention have a chlorine content of no more than 10 ppm and a sodium content of no more than 20 ppb. More specifically, nitrogen-containing basic compounds having a low content of sodium impurities such as this, and in particular tetraalkylammonium hydroxides sold as electronics-grade products can be used.

These nitrogen-containing basic compounds (a) can be used as aqueous solutions or phenol solutions.

In this invention, it is desirable that this nitrogen-containing basic compound (a) be used in an amount of $5 \times 10^{-5}$ to $7.5 \times 10^{-4}$ mole per mole of the total amount of aromatic dihydroxy compounds.

Moreover, according to this invention, in the copolycondensation reaction carried out in multiple steps as described later in this specification, the above-indicated amount of nitrogen-containing basic compound (a) may be added all at once in the initial step, or the required amount may be divided into two or more portions as required and these added in different copolycondensation steps.

When the nitrogen-containing basic compound (a) serving as the catalyst is added in the above-indicated amount to the copolycondensation system, and the aromatic dihydroxy compound and the diester carbonate are melt copolycondensed, a copolymeric polycarbonate can be prepared that undergoes little discoloration immediately after copolycondensation, has excellent residence stability during melt molding, and also has excellent water resistance.

Specific examples that may be cited of alkali metal compounds and alkaline earth metal compounds (b) that can be used in the present invention include the organic acid salts, inorganic acid salts, oxides, hydroxides, hydrides or alcoholates of alkali metals and alkaline earth metals.

Specific examples of such alkali metal compounds include sodium hydroxide, potassium hydroxide, lithium hydroxide, sodium bicarbonate, potassium bicarbonate, lithium bicarbonate, sodium carbonate, potassium carbonate, lithium carbonate, sodium acetate, potassium acetate, lithium acetate, sodium stearate, potassium stearate, lithium stearate, sodium boron hydride, lithium boron hydride, sodium boron phenylate, sodium benzoate, potassium benzoate, lithium benzoate, disodium hydrogen phosphate, dipotassium hydrogen phosphate, dilithium hydrogen phosphate, the disodium, dipotassium and dilithium salts of bisphenol A, and the sodium, potassium and lithium salts of phenol.

Specific examples of such alkaline earth metal compounds that may be cited include calcium hydroxide, barium hydroxide, magnesium hydroxide, strontium hydroxide, calcium hydrogen carbonate, barium hydrogen carbonate, magnesium hydrogen carbonate, strontium hydrogen carbonate, calcium carbonate, barium carbonate, magnesium carbonate, strontium carbonate, calcium acetate, barium acetate, magnesium acetate, strontium acetate, calcium stearate, barium stearate, magnesium stearate and strontium stearate.

These compounds may be used alone or as combinations thereof.

These (b) alkali metal compounds and/or alkaline earth metal compounds are used in an amount of $5 \times 10^{-8}$ to $8 \times 10^{-7}$ mole, preferably $1 \times 10^{-7}$ to $7 \times 10^{-7}$ mole, and most preferably $1 \times 10^{-7}$ to $6 \times 10^{-7}$ mole, per mole of the aromatic dihydroxy compounds.

It is desirable that this alkali metal compound or alkaline earth metal compound (b) be added to a copolycondensation reaction that is being carried out at a temperature of no more than 240° C., preferably no more than 180° C., and most preferably no more than 140° C. When these metal compounds (b) are added under such conditions, copolymeric polycarbonates having a high molecular weight, little discoloration, and excellent water resistance can be obtained.

In the method for preparing copolymeric polycarbonates according to the present invention, it is preferable to use also (c) a boric acid compound.

This boric acid compound (c) can be used as a catalyst at the time of the above-described melt copolycondensation, it can be added to the copolymeric polycarbonate [A] obtained as the reaction product following melt copolycondensation, or addition in both cases is possible. In the present invention, it is preferable for the boric acid compound to be added as a catalyst at the time of melt copolycondensation.

Examples of this type of boric acid compound (c) that may be cited include boric acid and borates.

Examples of borates that may be cited include the borates represented by the following formula.

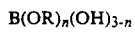

$B(OR)_n(OH)_{3-n}$ (where R is an alkyl such as methyl or ethyl, or an aryl such as phenyl; and n is 1, 2 or 3).

Specific examples that may be cited of these borates include trimethyl borate, triethyl borate, tributyl borate, trihexyl borate, triheptyl borate, triphenyl borate, tritolyl borate and trinaphthyl borate.

When boric acid or a borate is employed in the present invention, it is used in an amount of $1 \times 10^{-6}$ to $1 \times 10^{-4}$ mole per mole of the aromatic dihydroxy compound.

In the present invention, it is preferable to use the catalyst as a combination of:
(a) a nitrogen-containing basic compound, and
(b) an alkali metal compound and/or an alkalineearth metal compound; or as a combination of:
(a) a nitrogen-containing basic compound,
(b) an alkali metal compound and/or an alkalineearth metal compound; and
(c) boric acid or a borate.

When used in the above-mentioned amount, a catalyst consisting of the combination of
(a) a nitrogen-containing basic compound, and
(b) an alkali metal compound and/or an alkaline earth metal compound,
is desirable because it induces the copolycondensation reaction to proceed at a sufficient speed and causes the formation of high-molecular-weight copolymeric polycarbonate at a high polymerization activity.

By adding the boric acid compound (c) as a catalyst and/or to the copolymeric polycarbonate [A] obtained as the reaction product following melt copolycondensation, copolymer polycarbonates can be ultimately obtained that have an enhanced heat stability and, in particular, a suppressed molecular weight decrease during molding.

In the presence of this type of catalyst, the copolycondensation reaction between the aromatic dihydroxy compound and the diester carbonate can be carried out under the same conditions as the copolycondensation reaction conditions known to the art.

Specifically, in the step-one reaction, the aromatic dihydroxy compounds and the diester carbonate are reacted under normal pressure, at a temperature of 80°–240° C., preferably 100°–230° C., and most preferably 120°–220° C., and for a period of 0.1–5 hours, preferably 0.2–4 hours, and most preferably 0.25–3 hours.

The step-two reaction is then carried out under a reduced pressure of about 200 mmHg, at a temperature of 140°–300° C., preferably 160°–290° C., and most preferably 180°–280° C., and for a period of 0.1–5 hours, preferably 0.2–4 hours, and most preferably 0.25–3 hours.

Next, the copolycondensation reaction between the aromatic dihydroxy compound and the diester carbonate is carried out by raising the reaction temperature while lowering the pressure of the reaction system, ultimately attaining a vacuum of 0.05–5 mmHg and a temperature of 240°–320° C.

The copolycondensation reaction such as that described above may be carried out either as a continuous process or as a batch-type process. The reactor used when carrying out the above reaction may be a tank-type, tube-type or column-type reactor.

The polycondensation polycarbonate [A] obtained in the above manner as the reaction product normally has an intrinsic viscosity, as measured in 20° C. methylene chloride, of 0.25–1.0 dL/g, and preferably 0.30–0.65 dL/g.

The above-described method for preparing copolymeric polycarbonate according to the present invention is desirable from the standpoint of environmental health because it does not use toxic substances such as phosgene or methylene chloride.

The copolymeric polycarbonate compositions according to the present invention consist of a copolymeric polycarbonate [A] obtained in the above-described manner and a sulfonic acid compound [B] having formula [V] below.

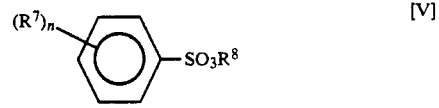

[V]

[where $R^7$ is a hydrocarbon group (in which the hydrogens may be substituted with halogens) having 1–6 carbons; $R^8$ is a hydrocarbon group (in which the hydrogens may be substituted with 1–8 carbons) having 1–8 carbons; and n is an integer from 0 to 3].

Specific examples that may be cited of the sulfonic acid compound [B] having this formula [V] include sulfonic acids such as benzenesulfonic acid and p-toluenesulfonic acid, and sulfonates such as methyl benzenesulfonate, ethyl benzenesulfonate, butyl benzenesulfonate, octyl benzenesulfonate, phenyl benzenesulfonate, methyl p-toluenesulfonate, ethyl p-toluenesulfonate, butyl p-toluenesulfonate, octyl p-toluenesulfonate, and phenyl p-toluenesulfonate.

In addition, sulfonic acid compounds such as trifluoromethanesulfonic acid, naphthalenesulfonic acid, sulfonated polystyrene, and methyl acrylatestyrene sulfonate copolymers can also be used.

These compounds can be used alone or as combinations of two or more thereof.

In the present invention, it is preferable that the sulfonic acid compound [B] represented by above formula [V] be used in an amount of 0.05–10 ppm, preferably 0.1–5 ppm, and most preferably 0.2–2 ppm, based on the copolymeric polycarbonate [A].

When a specific sulfonic acid compound [B] is added in an amount such as this to the copolymeric polycarbonate [A] obtained as the reaction product, the alkaline metal compound remaining within the copolymeric polycarbonate [A] is neutralized or weakened, making it possible to ultimately obtain a copolymeric polycarbonate with even further improved residence stability and water resistance.

In the copolymeric polycarbonate compositions according to the present invention, it is preferable to include an epoxy compound [C] together with the sulfonic acid compound [B] described above.

Compounds having one or more epoxy group per molecule may be used as this epoxy compound [C].

Specific examples that may be cited of epoxy compounds such as these include epoxidized soybean oil, epoxidized linseed oil, phenylglycidyl ether, allylglycidyl ether, t-butylphenylglycidyl ether, 3,4-epoxycyclohexylmethyl-3',4'-epoxycyclohexylcarboxylate, 3,4-epoxy-6-methylcyclohexylmethyl-3',4'-epoxy-6'-methylcyclohexylcarboxylate, 2,3-epoxycyclohexylmethyl-3',4'-epoxycyclohexylcarboxylate, 4-(3,4-epoxy-5-methylcyclohexyl)butyl-3',4'-epoxycyclohexylcarboxylate, 3,4-epoxycyclohexylethylene oxide, cyclohexylmethyl-3,4-epoxycyclohexylcarboxylate, 3,4-epoxy-6-methylcyclohexylmethyl-6'-methylcyclohexylcarboxylate, bisphenol A diglycidyl ether, tetrabromobisphenol A glycidyl ether, the diglycidyl ester of phthalic acid, the diglycidyl ester of hexahydrophthalic acid, bis-epoxydicyclopentadienyl ether, bis-epoxyethylene glycol, bis-epoxycyclohexyl adipate, butadiene diepoxide, tetraphenylethylene epoxide, octyl epoxyphthalate, epoxidized polybutadiene, 3,4-dimethyl-1,2-epoxycyclohexane, 3,5-dimethyl-1,2-epoxycyclohexane, 3-methyl-5-t-butyl-1,2-epoxycyclohexane, octadecyl-2,2-dimethyl-3,4-epoxycyclohexylcarboxylate, N-butyl-2,2-dimethyl-3,4-epoxycyclohexylcarboxylate, cyclohexyl-2-methyl-3,4-epoxycyclohexylcarboxylate, N-butyl-2-isopropyl-3,4-epoxy-5-methylcyclohexylcarboxylate, octadecyl-3,4-epoxycyclohexylcarboxylate, 2-ethylhexyl-3',4'-epoxycyclohexylcarboxylate, 4,6-dimethyl-2,3-epoxycyclohexyl-3',4'-epoxycyclohexylcarboxylate, 4,5-epoxytetrahydrophthalic anhydride, 3-t-butyl-4,5-epoxytetrahydrophthalic anhydride, diethyl-4,5-epoxy-cis-1,2-cyclohexyldicarboxylate and di-n-butyl-3-t-butyl-4,5-epoxy-cis-1,2-cyclohexyldicarboxylate.

Of these, the use of alicyclic epoxy compounds is preferable, with the use of 3,4-epoxycyclohexylmethyl-3',4'-epoxycyclohexylcarboxylate (formula [VI] below) being especially preferable.

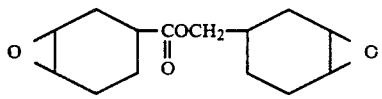

[VI]

These epoxy compounds may be used alone or as mixtures of two or more thereof.

In the present invention, this type of epoxy compound [C] should be added in an amount of 1–2000 ppm, and preferably 10–1000 ppm, based on the above copolymeric polycarbonate.

When this kind of epoxy compound [C] is added in the above amount, even if an excess of the above sulfonic acid compound [B] remains present within the copolymeric polycarbonate [A], it reacts with the epoxy compound [C] and is thereby neutralized, enabling a copolymeric polycarbonate having an improved water resistance to be obtained.

The copolymeric polycarbonate compositions according to the present invention may contain a phosphorus compound [D] along with the sulfonic acid compound [B].

Examples of compounds that may be used as this phosphorus compound [D] include phosphoric acid, phosphorous acid, hypophosphorous acid, pyrophosphoric acid, polyphosphoric acid, phosphates, and phosphites.

Specific examples that may be cited of phosphates such as these include trialkylphosphates such as trimethylphosphate, triethylphosphate, tributylphosphate, trioctylphosphate, tridecylphosphate, trioctadecylphosphate, distearylpentaerythrityldiphosphate, tris(2-chloroethyl)phosphate and tris(2,3-dichloropropyl)phosphate; tricycloalkylphosphates such as tricyclohexylphosphate; and triarylphosphates such as triphenylphosphate, tricresylphosphate, tris(nonylphenyl)phosphate and 2-ethylphenyldiphenylphosphate.

Examples that may be cited of the phosphites include those compounds having the following formula:

$$P(OR)_3 \qquad [VII]$$

(where R is an alicyclic hydrocarbon group, an aliphatic hydrocarbon group or an aromatic hydrocarbon group; the groups represented by R may be the same or different).

Specific examples that may be cited of compounds having this type of formula include trialkylphosphites such as trimethylphosphite, triethylphosphite, tributylphosphite, trioctylphosphite, tris(2-ethylhexyl)phosphite, trinonylphosphite, tridecylphosphite, trioctadecylphosphite, tristearylphosphite, tris(2-chloroethyl)phosphite and tris(2,3-dichloropropyl)phosphite; tricycloalkylphosphites such as tricyclohexylphosphite; triarylphosphites such as triphenylphosphite, tricresylphosphite, tris(ethylphenyl)phosphite, tris(2,4-di-t-butylphenyl)phosphite, tris(nonylphenyl)phosphite and tris(hydroxyphenyl)phosphite; and arylalkylphosphites such as phenyldidecylphosphite, diphenyldecylphosphite, diphenylisooctylphosphite, phenylisooctylphosphite and 2-ethylhexyldiphenylphosphite.

Other examples of phosphites that may be cited include distearylpentaerythrityldiphosphite and bis-(2,4-di-t-butylphenyl)pentaerythrityldiphosphite.

These phosphorus compounds can be used alone or as combinations thereof.

Of the above, it is desirable that the phosphorus compound [D] be a phosphite having the above formula, preferably an aromatic phosphite, and most preferably tris(2,4-di-t-butylphenyl)phosphite, In the present invention, the above-described phosphorus compound [D] is added in an amount of 10–1000 ppm, and preferably 50–500 ppm, based on the copolymeric polycarbonate [A].

The method for preparing copolymeric polycarbonate compositions according to the present invention shall now be described.

In the present invention, the above-described sulfonic acid compound [B], as well as the epoxy compound [C] and/or the phosphorus compound [D], may be added to the copolymeric polycarbonate [A] reaction product while the copolymeric polycarbonate [A] is in a molten state, or they may be added after remelting copolymeric polycarbonate [A] following pelletization. In the former case, these are added while the copolymeric polycarbonate [A] reaction product obtained within the reactor or within the extruder following completion of the polycondensation reaction is in a molten state.

More specifically, for example, after the copolymeric polycarbonate has been formed by adding compound [B] and also compounds [C] and [D] to the copolymeric polycarbonate [A] obtained by the copolycondensation reaction within the reactor, these may be passed through an extruder and pelletized. Alternatively, the copolymeric polycarbonate may be obtained by adding compound [B], and also compounds [C] and [D], then kneading these while the copolymeric polycarbonate [A] obtained in the polycondensation reaction is being passed through an extruder and pelletized.

These various compounds may be added simultaneously or separately. The order in which these compounds is added is of no import.

In the present invention, additives such as conventional heat stabilizers, ultraviolet absorbers, parting agents, colorants, antistatic agents, slip agents, antiblocking agents, lubricants, anti-fogging agents, natural oils, synthetic oils, waxes, organic fillers and inorganic fillers, examples of which are indicated below, may be added to the copolymeric polycarbonate obtained in the above manner, provided these do not have adverse effects upon the object of this invention. These additives may be added at the same time as the above compounds [B], [C] and [D], or they may be added separately.

Examples that may be cited of such heat stabilizers include phenol-based stabilizers, organic thioether-based stabilizers and hindered amine-based stabilizers.

Specific examples that may be cited of phenol-based stabilizers include n-octadecyl-3(4-hydroxy-3',5'-di-t-butylphenyl)propionate, tetrakis[(methylene-3-(3',5'-di-t-butyl-4-hydroxyphenyl)propionate]methane, 1,1,3(tris(2-methyl-4-hydroxy-5-t-butylphenyl)butane, distearyl(4-hydroxy-3-methyl-5-t-butyl)benzylmalonate and 4-hydroxymethyl-2,6-di-t-butylphenol. These may be used alone or as mixtures of two or more thereof.

Examples that may be cited of thioether-based stabilizers include dilauryl thiodipropionate, distearyl thiodipropionate, dimyristyl-3,3'-thiodipropionate, ditridecyl-3,3'-thiodipropionate and pentaerythritoltetrakis-(β-laurylthiopropionate).

These may be used alone or as mixtures of two or more thereof.

Examples that may be cited of hindered amine-type stabilizers include bis(2,2,6,6-tetramethyl-4-piperidyl)-sebacate, bis(1,2,2,6,6-pentamethyl-4-piperidyl)sebacate, 1-(2-[3-(3,5-di-t-butyl-4-hydroxyphenyl)propionyloxy]ethyl)-4-[3-(3,5-di-t-butyl-4-hydroxyphenyl)-propionyloxy]-2,2,6,6-tetramethylpiperidine, 8-benzyl-7,7,9,9-tetramethyl-3-octyl-1,2,3-triazaspiro[4,5]undecane-2,4-dione, 4-benzoyloxy-2,2,6,6-tetramethylpiperidine, 2-(3,5-di-t-butyl-4-hydroxybenzyl)-2-n-butylmalonic acid bis(1,2,2,6,6-pentamethyl-4-piperidyl) and tetrakis(2,2,6,6-tetramethyl-4-piperidyl)1,2,3,4-butanetetracarboxylate.

These may be used alone or as mixtures of two or more thereof.

These heat stabilizers should be used in an amount of 0.001–5 parts by weight, preferably 0.005–0.5 part by weight, and most preferably 0.01–0.3 part by weight, per 100 parts by weight of the copolymeric polycarbonate.

These heat stabilizers may be added in a solid state or in a liquid state.

It is preferable that this type of heat stabilizer be added while the copolymeric polycarbonate [A] is in a molten state during the period when it is cooled and pelletized [after removal] from the final polymerizer; by so doing, the thermal history incurred by the copolymeric polycarbonate is small. Moreover, when heating treatment such as extrusion or pelletization is again carried out, thermal decomposition can be suppressed because the copolymeric polycarbonate contains a heat stabilizer.

There is no particular restriction on the ultraviolet absorbers used, it being possible to use conventional ultraviolet absorbers such as salicylic acid-type ultraviolet absorbers, benzophenone-type ultraviolet absorbers, benzotriazole-type ultraviolet absorbers and cyanoacrylate-type ultraviolet absorbers.

Specific examples of salicylic acid-type ultraviolet absorbers that may be cited include phenylsalicylate and p-t-butylphenylsalicylate.

Examples that may be cited of benzophenone-type ultraviolet absorbers include 2,4-dihydroxybenzophenone, 2-hydroxy-4-methoxybenzophenone, 2,2'-dihydroxy-4-methoxybenzophenone, 2,2'-dihydroxy-4,4'-dimethoxybenzophenone, 2-hydroxy-4-methoxy-2'-carboxybenzophenone, 2-hydroxy-4-methoxy-5-sulfobenzophenonetrihydrate, 2-hydroxy-4-n-octoxybenzophenone, 2,2',4,4'-tetrahydroxybenzophenone, 4-dodecyloxy-2-hydroxybenzophenone, bis(5-benzoyl-4-hydroxy-2-methoxyphenyl)methane, and 2-hydroxy-4-methoxybenzophenone-5-sulfonic acid.

Examples that may be cited of benzotriazole-type ultraviolet absorbers include 2-(2'-hydroxy-5'-methylphenyl)benzotriazole, 2-(2'-hydroxy-3', 5'-di-t-butylphenyl)benzotriazole, 2-(2'-hydroxy-3'-t-butyl-5'-methylphenyl)-5-chlorobenzotriazole, 2-(2'-hydroxy-3',5'-di-t-butylphenyl)-5-chlorobenzotriazole, 2-(2'-hydroxy-5'-t-octylphenyl)benzotriazole, 2-(2'-hydroxy-3',5'-di-t-amylphenyl)benzotriazole, 2-[2'-hydroxy-3'-(3", 4", 5", 6"-tetrahydrophthalimidomethyl)-5'-methylphenyl]benzotriazole and 2,2'-methylenebis[4-(1,1,3,3-tetramethylbutyl)-6-(2H-benzotriazole-2-yl)phenol].

Examples that may be cited of cyanoacrylate-type ultraviolet absorbers include 2-ethylhexyl-2-cyano-3,3-diphenylacrylate and ethyl-2-cyano-3,3-diphenylacrylate. These may be used alone or as mixtures of two or more thereof.

These ultraviolet absorbers can generally be used in an amount of 0.001–5 parts by weight, preferably 0.005–1.0 part by weight, and even more preferably 0.01–0.5 part by weight, per 100 parts by weight of the copolymeric polycarbonate [A].

There is no particular restriction on the parting agents, it being possible to use common parting agents.

Examples of hydrocarbon-type parting agents that may be cited include natural and synthetic paraffins, polyethylene waxes and fluorocarbons.

Examples that may be cited of fatty acid-type parting agents are higher fatty acids such as stearic acid and hydroxystearic acid, and oxyfatty acids.

Examples that may be cited of fatty amide-type parting agents include fatty amides such as stearamide and ethylenebisstearamide, and alkylenebisfatty amides.

Examples that may be cited of alcohol-type parting agents include fatty alcohols such as stearyl alcohol and cetyl alcohol, polyhydric alcohols, polyglycols and polyglycerols.

Examples that may be cited of fatty ester-type parting agents include the lower alcohol esters of fatty acids such as butyl stearate and pentaerythritol tetrastearate, the polyhydric alcohol esters of fatty acids, and the polyglycol esters of fatty acids.

Examples that may be cited of silicone-type parting agents include silicone oils.

These [parting agents] may be used alone or as mixtures of two or more thereof.

These parting agents can generally be used in an amount of 0.001-5 parts by weight, preferably 0.005-1 part by weight, and most preferably 0.01-0.5 part by weight, per 100 parts by weight of the copolymeric polycarbonate [A].

The colorants used in the present invention may be pigments or dyes. There are both inorganic and organic colorants, either of which may be used; it is also possible to use combinations of both.

Specific examples that may be cited of inorganic colorants include oxides such as titanium dioxide and red oxide, hydroxides such as alumina white, sulfides such as zinc sulfide, selenides, ferrocyanides such as Prussian blue, chromates such as zinc chromate and molybdenum red, sulfates such as barium sulfate, carbonates such as calcium carbonate, silicates such as ultramarine blue, phosphates such as manganese violet, carbons such as carbon black, and metal powder colorants such as bronze powder and aluminum powder.

Specific examples of organic colorants that may be cited include nitroso compounds such as naphthol green B, nitro compounds such as naphthol yellow S, azo compounds such as lithol red, bordeaux 10B, naphthol red and chromophthal yellow; phthalocyanine compounds such as phthalocyanine blue and fast sky blue, and condensed polycyclic colorants such as indanthrone blue, quinacridone violet and dioxazine violet.

These colorants may be used alone or as combinations thereof.

These colorants can generally be used in an amount of $1 \times 10^{-6}$ to 5 parts by weight, preferably $1 \times 10^{-5}$ to 3 parts by weight, and most preferably $1 \times 10^{-5}$ to 1 part by weight, per 100 parts by weight of the copolymeric polycarbonate [A].

In this invention, the copolymeric polycarbonate obtained in the above manner should be administered vacuum treatment.

There is no particular restriction on the apparatus used when carrying out this type of vacuum treatment; for example, a reactor equipped with a vacuum apparatus or an extruder equipped with a vacuum apparatus may be used.

When a reactor is used, this may be either a vertical tank-type reactor or a horizontal tank-type reactor, although use of a horizontal tank-type reactor is most preferable.

When the vacuum treatment is conducted in the above-described type of reactor, it is carried out at a pressure of 0.05-750 mmHg, and preferably 0.05-5 mmHg.

When this kind of vacuum treatment is conducted using an extruder, it should be carried out over a period of about 10 seconds to 15 minutes. When it is conducted using a reactor, it should be carried out over a period of about 5 minutes to 3 hours. The vacuum treatment should be carried out at a temperature of about 240°-350° C.

When the vacuum treatment is carried out in an extruder, a single-screw extruder or twin-screw extruder equipped with a vent may be used. Pelletization can be carried out while conducting vacuum treatment in an extruder.

When vacuum treatment is carried out in an extruder, the vacuum treatment is carried out at a pressure of 1-750 mmHg, and preferably 5-700 mmHg.

When vacuum treatment is administered in this way after the addition to the copolymeric polycarbonate [A] of, preferably, a sulfonic acid compound [B], an epoxy compound [C] and a phosphorus compound [D], a copolymeric polycarbonate having a reduced level of residual monomers and oligomers can be obtained. The copolymeric polycarbonate thus obtained does not readily give rise to fouling of the mold during molding, is capable of forming molded bodies having an excellent molding quality, and is able to reduce the frequency of mold replacement.

In the method for preparing copolymeric polycarbonates according to the present invention, as described above, aromatic dihydroxy compounds containing specific amounts of specific dihydroxy compounds are melt copolycondensed with a diester carbonate. In the present invention, it is preferable that specific sulfonic acid compounds, as well as epoxy compounds and phosphorus compounds, be added to the copolymeric polycarbonate obtained following copolycondensation.

Because the copolymeric polycarbonate obtained in the above manner has excellent long-term hue stability and mechanical properties, and can be formed into molded bodies having outstanding resistance to chemicals, heat resistance, flame retardancy and transparency, broad use can be made of such copolymeric polycarbonates, particularly in optical applications such as sheets, lenses and compact disks, in transparent components for automobiles or the like used outdoors, and also in housings for various types of equipment.

ADVANTAGES OF THE INVENTION

As described above, the copolymeric polycarbonates according to the present invention contain a specific amount of constituent units derived from specific aromatic dihydroxy compounds.

The copolymeric polycarbonates constituted in this way have an enhanced chemical resistance, heat resistance and flame retardancy while retaining the impact resistance and good hue intrinsic to polycarbonates.

In the method of preparing copolymeric polycarbonates according to the present invention, an aromatic dihydroxy compound containing specific amounts of specific dihydroxy compounds is melt copolycondensed with a diester carbonate in the presence of specific amounts of specific catalysts.

Through the method of preparing copolymeric polycarbonates according to this invention, copolymeric polycarbonates which have an enhanced chemical resistance, heat resistance and flame retardancy while retaining the impact resistance and good hue intrinsic to polycarbonates can be easily prepared.

In addition, a specific sulfonic acid compound, as well as an epoxy compound and a phosphorus compound, are preferably added to the copolymeric polycarbonate obtained after copolycondensation, thereby making it possible to obtain a copolymeric polycarbonate composition having an even further improved water resistance and hue stability.

The copolymeric polycarbonate compositions thus obtained are able to form molded bodies having excellent long-term hue stability and excellent transparency, thereby enabling broad and advantageous use of these, particularly in optical applications such as sheets, lenses and compact disks, in transparent components for automobiles or the like used outdoors, and also in housings for various types of equipment.

The present invention shall now be described by means of examples, although the invention shall in no way be restricted by these examples.

EXAMPLES

In this specification, the intrinsic viscosity (IV), MFR, yellow index (YI), light transmittance, haze, residence stability, water resistance and heat distortion temperature of the copolymeric polycarbonate were measured as follows.

Intrinsic Viscosity (IV)

This was measured at 20° C. in methylene chloride using an Ubbelohde viscometer.

Yellow Index (YI)

An injection-molded sheet having a thickness of 3 mm was molded at a cylinder temperature of 320° C., an injection pressure of 1000 kg/cm², a cycle time of 45 seconds, and a mold temperature of 90° C. The X, Y and Z values were measured by the transmission method using a Color and Color Difference Meter ND-1001 DP made by Nippon Denshoku Kogyo KK, and the yellow index (YI) was measured.

$$YI = (100/Y) \times (1.277X - 1.060Z)$$

Light Transmittance

The light transmittance of an injection-molded sheet having a thickness of 3 mm was measured using an NDH-200 unit made by Nippon Denshoku Kogyo KK.

Haze

The haze of an injection-molded sheet having a thickness of 3 mm was measured using an NDH-200 unit made by Nippon Denshoku Kogyo KK.

MFR (g/10 min)

This was measured at a temperature of 300° C. and a load of 1.2 kg in general accordance with the method in JIS K-7210.

Izod Impact Strength

This was measured using an injection molded test piece measuring $63.5 \times 12.7 \times 3$ mm (notched), in general accordance with ASTM D256.

Heat Distortion Temperature (HDT)

This was measured by applying a load of 264 psi to an injection-molded test piece measuring $0.5 \times 0.5 \times 5$ inches.

Residence Stability

After holding [the composition] within the cylinder of the injection molding machine for 15 minutes at a temperature of 320° C., injection molding was carried out at that temperature. The MFR and yellow index (YI) of the resulting molded sheet were measured.

Water Resistance

An injection-molded sheet having a thickness of 3 mm was immersed in water within an autoclave, and held for 5 days in an oven at 125° C. The haze was measured using this test piece.

Resistance to Chemicals

An ASTM No. 1 dumbbell was immersed in gasoline for 7 days, after which a tensile test was carried out with an Instron 1132 at an interchuck distance of 115 mm and a crosshead speed of 50 mm/min, and the percent retention of the tensile strength before immersion was determined.

Flame Retardancy

A U.L. Bulletin 94 flame test was carried out using five ⅛-inch test pieces.

EXAMPLE 1

After charging a 250-liter tank-type stirring tank with 286 moles of the compound having above formula [III] (bisphenol A), 154 moles of the compound having above formula [IV] (biphenol) and 460 moles of diphenyl carbonate, then flushing the tank with nitrogen, [the mixture] was melted at 140° C.

Next, 110 mmol ($2.5 \times 10^{-4}$ mole/mole of the aromatic dihydroxy compounds) of tetramethylammonium hydroxide and 0.176 mmol ($4 \times 10^{-7}$ mole/mole of the aromatic dihydroxy compounds) of sodium hydroxide were added as the catalysts, [the mixture] was stirred for 30 minutes at 140° C., and the step one reaction was carried out.

The temperature was then raised to 210° C., after which the pressure was gradually lowered to 200 mmHg, [the mixture] was stirred for 30 minutes, and the step two reaction was carried out.

Next, the temperature was raised to 240° C., the pressure was gradually lowered to 15 mmHg, the mixture was stirred for one hour, and the step three reaction was carried out. The reaction product thus obtained was pressurized with a gear pump and sent into a centrifugal thin-film evaporator, where the reaction was allowed to proceed. The temperature and pressure of the thin-film evaporator were respectively controlled to 270° C. and 2 mmHg.

Next, the reaction product was sent at a rate of 40 kg/hour by means of a gear pump from the bottom of the evaporator into a two-shaft lateral-type stirring polymerization tank (L/D=3; stirring element rotational diameter, 220 mm; internal capacity, 80 liters) controlled to 290° C. and 0.2 mmHg, and polymerized at a residence time of 30 minutes.

The polymer thus obtained was then sent in a molten state by means of a gear pump into a twin-screw extruder (L/D=17.5; barrel temperature, 285° C.). After the addition of 0.7 ppm of butyl p-toluenesulfonate, 300 ppm of tris(2,4-di-t-butylphenyl)phosphite ("Mark"* 2112; "Adeka Argus" Co.) and 300 ppm of 3,4-epoxycyclohexylmethyl-3',4'-epoxycyclohexylcarboxylate ("Celloside" 2021P; Daicel Chemical Industries), [this mixture] was kneaded, passed through a die and formed into strands, then cut so as to give pellets.

*Translator's Note: Proper names for which the spellings are unconfirmed are enclosed in quotation marks.

The tetramethylammonium hydroxide used was a 20% aqueous solution that is marketed as an electronics grade product. The sodium content in the aqueous solution was 9 ppb, and the chlorine content was 3 ppm.

The results are shown in Table 1.

EXAMPLE 2

This was carried out in the same manner as in Example 1, except for the use of 330 moles of the compound having formula [III] (bisphenol A) and 110 moles of the compound having formula [IV] (biphenol).

The results are shown in Table 1.

EXAMPLE 3

This was carried out in the same manner as in Example 1, except for the use of 374 moles of the compound having formula [III] (bisphenol A) and 66 moles of the compound having formula [IV] (biphenol).

The results are shown in Table 1.

EXAMPLE 4

This was carried out in the same manner as in Example 1, except for the use of 396 moles of the compound having formula [III] (bisphenol A) and 44 moles of the compound having formula [IV] (biphenol).

EXAMPLE 5

This was carried out in the same manner as in Example 1, except for the use of 418 moles of the compound having formula [III] (bisphenol A) and 22 moles of the compound having formula [IV] (biphenol).

EXAMPLE 6

This was carried out in the same manner as in Example 1, except that tris(2,4-di-t-butylphenyl)phosphite was not used.

The results are shown in Table 1.

EXAMPLE 7

This was carried out in the same manner as in Example 4, except that the 3,4-epoxycyclohexylmethyl3',4'-epoxycylohexylcarboxylate in Example 6 [sic] was not used.

The results are shown in Table 1.

EXAMPLE 8

This was carried out in the same manner as in Example 5, except that 0.088 mmol ($2 \times 10^{-7}$ mole/mole of aromatic dihydroxy compound) of sodium hydroxide was used and the butyl p-toluenesulfonate in Example 7 [sic] was not used.

The results are shown in Table 1.

EXAMPLE 9

This was carried out in the same manner as in Example 1, except that 11 mmol ($2.5 \times 10^{-5}$ mole/mole of aromatic dihydroxy compound) of boric acid was added during polymerization and butyl p-toluenesulfonate was not used.

The results are shown in Table 1.

REFERENCE EXAMPLE 1

This was carried out in the same manner as in Example 1, except that 440 moles of the compound having formula [III] (bisphenol A) was used, and the compound having formula [IV] (biphenol) was not used.

The results are shown in Table 1.

REFERENCE EXAMPLE 2

This was carried out in the same manner as in Example 8, except that 440 moles of the compound having formula [III] (bisphenol A) was used, and the compound having formula [IV] (diphenol) was not used.

The results are shown in Table 1.

TABLE 1

| | Ex. 1 | Ex. 2 | Ex. 3 | Ex. 4 | Ex. 5 | Ex. 6 | Ex. 7 | Ex. 8 | Ex. 9 | Ref. Ex. 1 | Ref. Ex. 2 |
|---|---|---|---|---|---|---|---|---|---|---|---|
| Aromatic Dihydroxy Compounds | | | | | | | | | | | |
| [III] Bisphenol A (mol %) | 65 | 75 | 85 | 90 | 95 | 65 | 65 | 65 | 65 | 100 | 100 |
| [IV] Biphenol (mol %) | 35 | 25 | 15 | 10 | 5 | 35 | 35 | 35 | 35 | — | — |
| Catalysts | | | | | | | | | | | |
| Me$_4$NOH ($10^{-4}$ mole/aromatic dihydroxy compound) | 2.5 | 2.5 | 2.5 | 2.5 | 2.5 | 2.5 | 2.5 | 2.5 | 2.5 | 2.5 | 2.5 |
| NaOH ($10^{-7}$ mole/aromatic dihydroxy compound) | 4 | 4 | 4 | 4 | 4 | 4 | 4 | 2 | 4 | 4 | 2 |
| Boric acid ($10^{-5}$ mole/aromatic dihydroxy compound) | — | — | — | — | — | — | — | — | 2.5 | — | — |
| Additives (ppm) | | | | | | | | | | | |
| Butyl p-toluenesulfonate | 0.7 | 0.7 | 0.7 | 0.7 | 0.7 | 0.7 | 0.7 | — | — | 0.7 | — |
| 3,4-Epoxycyclohexylmethyl-3,4-epoxycyclohexyl carboxylate | 300 | 300 | 300 | 300 | 300 | 300 | — | — | 300 | 300 | — |
| Tris(2,4-di-t-butylphenyl)-phosphite | 300 | 300 | 300 | 300 | 300 | — | — | — | 300 | 300 | — |
| Initial Properties | | | | | | | | | | | |
| IV (dL/g) | 0.49 | 0.49 | 0.49 | 0.49 | 0.49 | 0.49 | 0.49 | 0.49 | 0.49 | 0.49 | 0.49 |
| MFR (g/10 min) | 9.5 | 9.6 | 9.8 | 9.9 | 10.2 | 9.5 | 9.5 | 9.5 | 9.5 | 10.4 | 10.4 |
| YI | 1.41 | 1.41 | 1.40 | 1.42 | 1.42 | 1.41 | 1.40 | 1.35 | 1.39 | 1.41 | 1.35 |
| Light transmittance (%) | 90.9 | 90.9 | 90.9 | 90.9 | 90.9 | 90.9 | 90.9 | 91.0 | 91.0 | 90.9 | 91.0 |
| Haze | 0.2 | 0.2 | 0.2 | 0.2 | 0.2 | 0.2 | 0.2 | 0.2 | 0.2 | 0.2 | 0.2 |
| Izod impact strength, notched (kg · cm/cm) | 60 | 65 | 69 | 68 | 79 | 62 | 60 | 63 | 61 | 85 | 85 |
| Chemical Resistance | | | | | | | | | | | |
| Tensile strength retention (%) after 7 days immersion in gasoline | 100 | 97 | 82 | 78 | 72 | 99 | 100 | 100 | 99 | 64 | 63 |
| Heat Resistance | | | | | | | | | | | |
| HDT (°C.) | 138 | 137 | 135 | 134 | 132 | 138 | 138 | 138 | 138 | 131 | 131 |
| Izod impact strength, notched (kg · cm/cm) after 24 hours heating at 120° C. | 44 | 25 | 8 | 10 | 8 | 43 | 45 | 44 | 42 | 6 | 7 |
| Flame Retardancy | | | | | | | | | | | |
| UL-94 | V-0 | V-0 | V-1 | V-1 | V-1 | V-0 | V-0 | V-0 | V-0 | V-2 | V-2 |
| Residence Stability | | | | | | | | | | | |
| YI | 1.42 | 1.42 | 1.41 | 1.42 | 1.41 | 1.47 | 1.51 | 1.47 | 1.41 | 1.41 | 1.52 |
| MFR rise (%) | 2 | 2 | 2 | 2 | 2 | 2 | 2 | 4 | 2 | 2 | 5 |
| Water Resistance | | | | | | | | | | | |

TABLE 1-continued

|  | Ex. 1 | Ex. 2 | Ex. 3 | Ex. 4 | Ex. 5 | Ex. 6 | Ex. 7 | Ex. 8 | Ex. 9 | Ref. Ex. 1 | Ref. Ex. 2 |
|---|---|---|---|---|---|---|---|---|---|---|---|
| Haze | 0.8 | 0.8 | 0.8 | 0.8 | 0.8 | 0.5 | 0.6 | 0.7 | 0.8 | 0.8 | 0.7 |

We claim:

1. A method of producing copolymerized polycarbonates comprising the steps of:

melt condensing a first aromatic dihydroxy compound having the formula

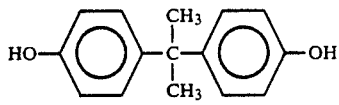

with a second aromatic dihydroxy compound having the formula

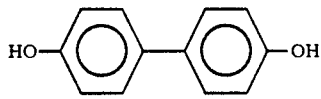

with a carbonate diester in the presence of an alkaline compound catalyst and a boric acid compound catalyst.

2. A method according to claim 1 wherein a boric acid compound is added to said polycarbonate after melt polycondensation.

3. A method according to claim 1 wherein the molar ratio of said first aromatic dihydroxy compound to said second aromatic dihydroxy compound ranges from about 98:2 to about 40:60.

4. A method according to claim 1 wherein said alkaline compound is selected from the group consisting of nitrogen-containing basic compounds, alkali metal compounds and alkaline earth metal compounds.

5. A method according to claim 1 wherein said boric acid compound is selected from the group consisting of boric acid and borates.

6. A method according to claim 5 wherein said borate is selected from the group comprising trimethyl borate, triethyl borate, tributyl borate, trihexyl borate, triheptyl borate, triphenyl borate and trinaphthyl borate.

7. A method according to claim 1 wherein said boric acid compound comprises from about $1 \times 10^{-6}$ to about $1 \times 10^{-4}$ mole per mole of aromatic dihydroxy compounds.

* * * * *